United States Patent [19]

Mergenthaler et al.

[11] Patent Number: 5,039,283
[45] Date of Patent: Aug. 13, 1991

[54] DEVICE FOR ANTI-SKID BRAKE SYSTEM

[75] Inventors: Robert Mergenthaler, Markgroeningen; Wilhelm Zirps, Hemmingen; Wolfgang Maisch, Schwiebergingen, all of Fed. Rep. of Germany

[73] Assignee: Robert Bosch GmbH, Stuttgart, Fed. Rep. of Germany

[21] Appl. No.: 426,270

[22] Filed: Oct. 25, 1989

[30] Foreign Application Priority Data

Jan. 7, 1989 [DE] Fed. Rep. of Germany ....... 3900327

[51] Int. Cl.$^5$ ................................................ F04B 1/04
[52] U.S. Cl. ........................................ 417/273; 74/55; 92/129; 303/87; 464/89
[58] Field of Search ............... 417/273, 271, 269, 415, 417/523, 542, 538; 92/129; 464/83, 89, 90, 91; 303/87; 74/55, 569, 570

[56] References Cited

U.S. PATENT DOCUMENTS

| 1,940,884 | 12/1933 | Rosenberg | 464/91 |
|---|---|---|---|
| 2,323,216 | 6/1943 | Goldschmidt | 464/83 |
| 2,871,846 | 2/1959 | Zimmerman | 417/273 |
| 3,573,514 | 4/1971 | Race | 417/415 |
| 4,311,437 | 1/1982 | Liska | 417/273 |
| 4,516,956 | 5/1985 | Staiezt | 464/89 |
| 4,772,245 | 9/1988 | Readman et al. | 464/89 |
| 4,850,825 | 7/1989 | Budecker | 417/538 |

FOREIGN PATENT DOCUMENTS

| 2336973 | 6/1975 | Fed. Rep. of Germany . |
| 2412719 | 9/1975 | Fed. Rep. of Germany . |
| 2413719 | 9/1975 | Fed. Rep. of Germany . |

Primary Examiner—Leonard E. Smith
Assistant Examiner—Michael I. Kocharov
Attorney, Agent, or Firm—Edwin E. Greigg; Ronald E. Greigg

[57] ABSTRACT

The invention relates to a device for a hydraulic unit, in particular in anti-skid systems for vehicle brake systems, which has a radial piston pump. The eccentric driven by a drive shaft in the pump meets pump pistons also located in the pump, usually in the region of high stroke variation speed. An resultant mechanical and hydraulic vibration, which causes noise and annoying movement at the brake pedal, is counteracted according to the invention in that a resilient intermediate element is disposed between the pump pistons and the eccentric element, and the eccentric is driven via a torsionally elastic coupling.

15 Claims, 3 Drawing Sheets

DEVICE FOR ANTI-SKID BRAKE SYSTEM

BACKGROUND OF THE INVENTION

The invention relates to a device for a hydraulic unit, in particular in anti-skid systems for vehicle brake systems.

Devices of this type are included in motor vehicle brake systems provided with anti-skid systems. The vehicle brake systems are mounted on the wheels of the vehicle and provided with brake pressure lines that lead to the hydraulic brake system. To generate brake pressure and hence braking action, a master brake cylinder is actuated with the aid of a foot pedal. In modern vehicles, anti-skid systems are additionally built in with which in anti-skid operation a braking pressure is likewise generated for an automatically adapted braking, which nevertheless prevents wheel locking. To this end, sensors are attached to the wheels to detect any danger of locking, or skidding, and via a control unit signals from the sensors act on a motor, a return pump and magnetic control valves, for example, and thus effect suitable pressure changes in the brake lines compared with the pressure of the master brake cylinder. In the process of pressure equalization at the master brake cylinder, pulsations are created that are perceptible to the driver at the foot pedal. The process produces irritating noises as well.

German Offenlegungsschrift 23 36 973 discloses a device of the above-mentioned type. In this known version of a radial piston fluid pump, a pump piston is forced with a drive side against an eccentric cam. The drive side of the pump piston is provided with a recess to receive a sliding body, which is defined in that it comprises an elastic plastic, that the height of the sliding body is greater than the depth of the recess, and that the sliding body is axially movable in the recess. This is intended to prevent the loud percussive noises that is produced by the pistons as they lift up from the cam race if the pilot pressure in such pumps fails. In the pumping strokes that occur, the sliding body is intended to elastically absorb the resultant impacts, both to prevent noise from being generated and to prevent undue strain on the cam race.

To prevent recoiling motion of the brake pedal, German Offenlegungsschrift 34 38 646 proposes a device for controlling the hydraulic pressure, which can prevent the brake pedal from recoiling when the vehicle is braked. Complete suppression of pedal feedback proves to be disadvantageous, however, if the feedback means is missing so that the driver does not learn that his ABS or anti-skid system has come into play.

OBJECT AND SUMMARY OF THE INVENTION

In a device of the type referred to at the outset above, a lessening of the irritating noise and pedal feedback movement is attained by the provisions recited herein without a sense of touch feedback to the driver to inform him the ABS is coming into play.

The return pump eccentric that drives the pump piston usually meets the pump pistons in a region of high stroke variation speed, and the pump pistons in turn run up against the hydraulic column before them. This causes mechanical and hydraulic vibrations and noise and forces the brake pedal rapidly back by a certain distance, because there is no other route of escape for the brake fluid. By disposing a resilient intermediate element between the pump pistons and the eccentric driving them, the drive force is not rigidly transmitted but instead softly via the eccentric. As a result, a delay in the stroke onset is attained for pumping brake fluid, and an abrupt buildup of pressure is avoided.

The resilient effect is attained either by a spring element embodied on the face end of the pump piston oriented toward the eccentric, or by making the resilient intermediate element of elastic plastic.

This effect is further reinforced by not rigidly driving the eccentric but instead via a torsionally elastic coupling. The hydraulic and mechanical impacts are reduced by providing two cup-shaped parts, in the housing of the radial piston fluid pump, that are joined to one another by a plurality of ribs. One of the cup-shaped parts is connected to the motor drive shaft and the other to the pump drive shaft. Once again, a delay in the pumping stroke is attained.

The ribs are preferably of elastic material, which provides a torsional elasticity between the motor drive shaft and the pump drive shaft.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
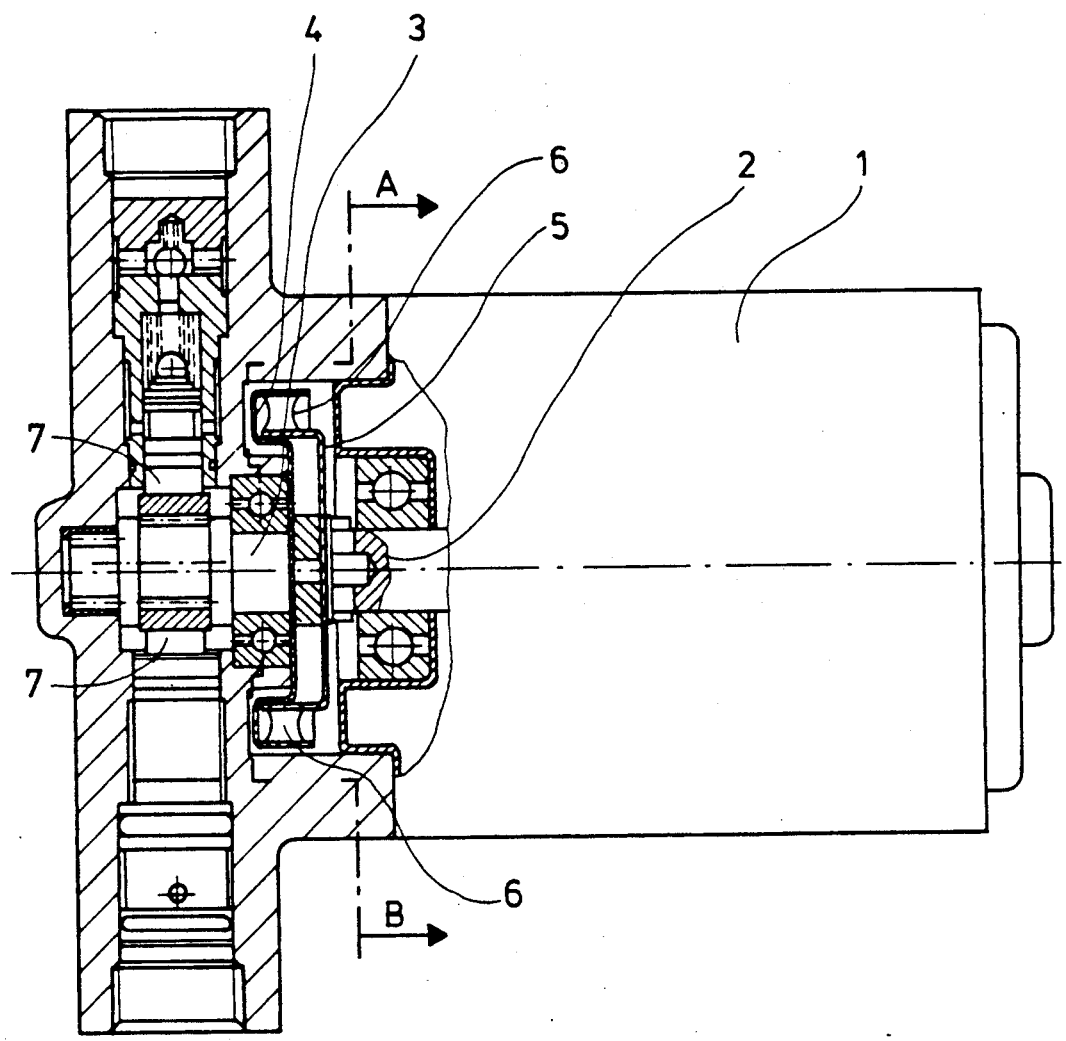
FIG. 1 is a side view of the device according to the invention, seen partly in cross section.
Figure 2:
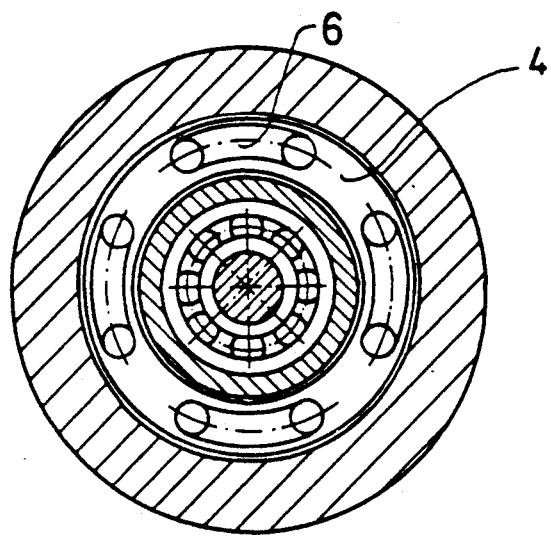
FIG. 2 is a plan view of the device according to the device of FIG. 1, in the region of the eccentric, in a section taken along the line A-B of FIG. 1.
Figure 3:
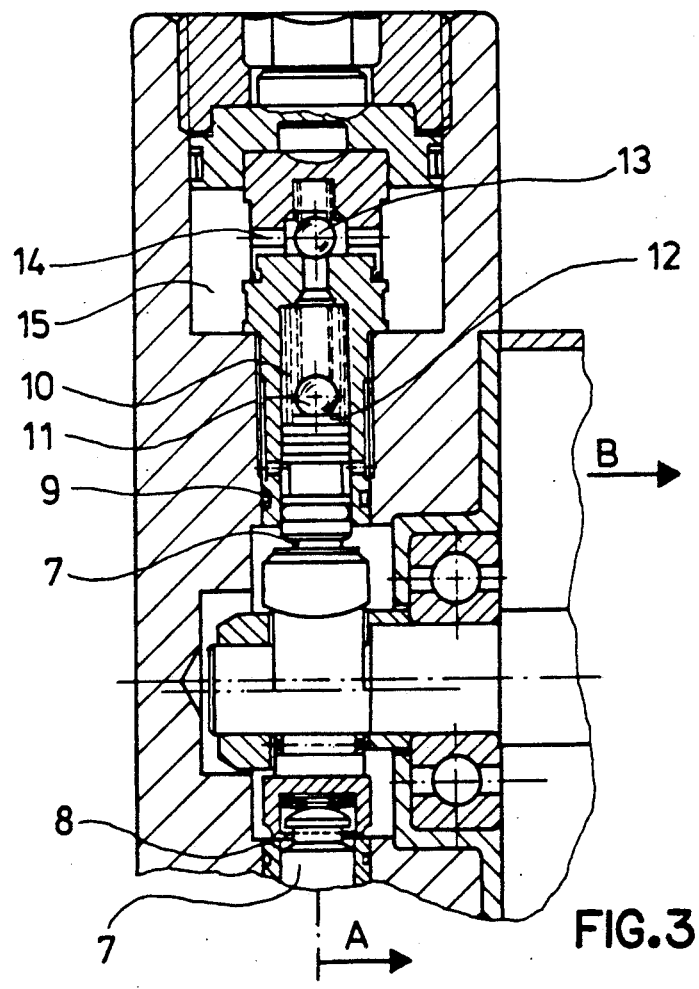
FIG. 3 is an enlarged detail of the side view of the device according to the device of FIG. 1.

In FIG. 1, a radial piston fluid pump is shown, the housing 1 of which, shown partially cut away, provides a side view of the device according to the invention. Cup-shaped parts 4 and 5 of different diameter are disposed in the housing of the radial piston fluid pump, in the region of the connection point between the motor drive shaft 2 and the pump drive shaft 3. A radial connection between the parts 4 and 5 is made with the aid of spaced ribs 6 of rubber-elastic material. Such a connection acts torsionally elastically between the motor drive shaft 2 and the pump drive shaft 3. Vibration arising at the motor drive shaft 2 is transmitted with a slight delay to the pump drive shaft 3. This delays the stroke onset in the pumping of brake fluid. Hydraulic impacts and hence mechanical impacts are thereby reduced. The position of the pump pistons 7 is also visible in the drawing. The plan view of FIG. 2 on the section line A-B of FIG. 1 shows the elastic ribs 6 through recesses on the cup-shaped part 4.

The enlarged detail of the radial piston fluid pump shows the pump pistons 7, which are guided in lifting cylinders 8. The lifting cylinders 8 have recesses, in the vicinity of the face end of the pump pistons 7, in which O-rings 9 are placed. The pump pistons 7 have bores, not visible in the drawing, so that brake fluid can flow through them. Farther along the lifting cylinder 8 is a suction valve, comprising valve springs 10 and a valve ball 11. During the intake process, the ball 11 of the suction valve opens the pump pistons 7, in that the ball 11 rises from a valve seat 12 located on the pump pistons 7, which enables the flow through the valve of brake fluid. The further valve 13, located above the suction valve in the view shown in the drawing, opens, so that brake fluid can flow out into the chambers 15 through lateral openings 14 located in this region. On the other hand, if the intake stroke pressure drops, then the flow through the valve of the brake fluid is prevented, because the ball closes the pump pistons 7 at its valve seat 12.

Figures 4A, 4B:
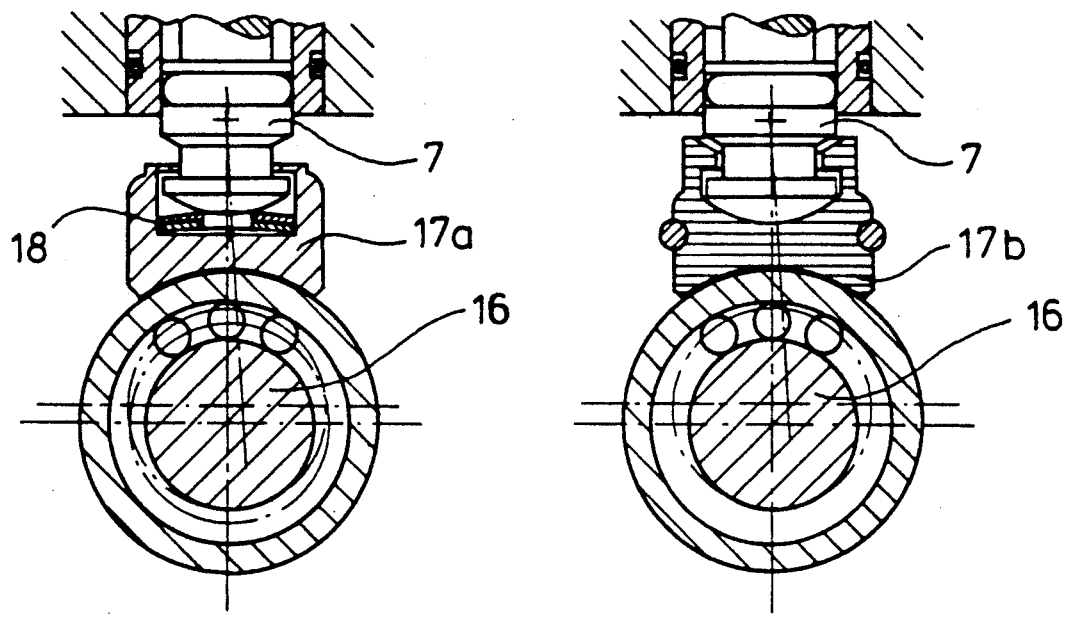
FIGS. 4a and 4b show the device in a fragmentary section taken along the line A-B of FIG. 3.

FIGS. 4a and 4b shows two embodiments of the resilient intermediate elements according to the invention. An intermediate element 17a FIG. 4a or 17b FIG. 4b is disposed between the pump piston 7 and the eccentric drive 16. The eccentric drive 16 may be made from radially, resilient elastic material. The embodiment of the intermediate element 17a additionally incorporates a spring element 18, comprising two cup springs. In the embodiment 17b, the intermediate element is itself made of an elastic plastic. The drive force transmitted to the pump pistons 7 is accordingly propagated gently, rather than rigidly. As a result, a delay in the stroke onset is attained.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A device for a hydraulic drive unit in particular in an anti-skid system of vehicle brake systems, which includes a radial piston fluid pump, pump pistons in said fluid pump, lifting cylinders in said pump pistons which are guided and moved via an eccentric (16) made of radially resilient, elastic material and driven by a pump drive shaft, a motor drive shaft that drives said pump drive shaft, and means disposed between said pump pistons (7) and the eccentric (16) for driving said pump pistons (7).

2. A device for a hydraulic drive unit in particular in an anti-skid system of vehicle brake systems, which includes a radial piston fluid pump, pump pistons in said fluid pump, lifting cylinders in said pump pistons which are guided and moved via an eccentric (16) driven by a pump drive shaft, a motor drive shaft that drives said pump drive shaft, a resilient intermediate element (17a, b) disposed between the end surface of said pump pistons (7) and the eccentric (16) which is driven via a torsionally elastic supported coupling, and said resilient intermediate element has a much greater cross section perpendicular to the axis of said pump piston (7) than the cross section of said pistons perpendicular to their axis.

3. A device as defined by claim 2, in which said intermediate element (17b) comprises an elastic plastic.

4. A device for a hydraulic drive unit in particular in an anti-skid system of vehicle brake systems, which includes a radial piston fluid pump, pump pistons in said fluid pump, lifting cylinders in said pump pistons which are guided and moved via an eccentric (16) made of radially resilient, elastic material and driven by a pump drive shaft, a motor drive shaft that drives said pump drive shaft, and a resilient intermediate element (17a, b) disposed between the end surface of said pump pistons (7) and the eccentric (16) which is driven via a torsionally elastic supported coupling.

5. A device as defined by claim 4, in which said intermediate element (17a) includes at least one cup spring (18) embodied as a spring element.

6. A device as claimed in claim 5, which includes two cup springs (18).

7. A device as defined by claim 4, in which said intermediate element (17b) comprises an elastic plastic.

8. A device as defined by claim 4, in which said torsionally elastic coupling comprises a plurality of ribs (6), which joins together first and second cup-shaped parts (4, 5) of different diameters located in the housing of the radial piston fluid pump (1), said first cup-shaped part is disposed on the motor drive shaft (2) and said second cup-shaped part disposed on said pump drive shaft (3).

9. A device as defined by claim 5, in which said torsionally elastic coupling comprises a plurality of ribs (6), which joins together first and second cup-shaped parts (4, 5) of different diameters located in the housing of the radial piston fluid pump (1), said first cup-shaped part is disposed on the motor drive shaft (2) and said second cup-shaped part disposed on said pump drive shaft (3).

10. A device as defined by claim 6, in which said torsionally elastic coupling comprises a plurality of ribs (6), which joins together first and second cup-shaped parts (4, 5) of different diameters located in the housing of the radial piston fluid pump (1), said first cup-shaped part is disposed on the motor drive shaft (2) and said second cup-shaped part disposed on said pump drive shaft (3).

11. A device as defined by claim 7, in which said torsionally elastic coupling comprises a plurality of ribs (6), which joins together first and second cup-shaped parts (4, 5) of different diameters located in the housing of the radial piston fluid pump (1), said first cup-shaped part is disposed on the motor drive shaft (2) and said second cup-shaped part disposed on said pump drive shaft (3).

12. A device as defined by claim 8, in which said ribs (6) comprise elastic material.

13. A device as defined by claim 9, in which said ribs (6) comprise elastic material.

14. A device as defined by claim 10, in which said ribs (6) comprise elastic material.

15. A device as defined by claim 11, in which said ribs (6) comprise elastic material.

* * * * *